United States Patent [19] [11] 4,103,877
Pfeuffer [45] Aug. 1, 1978

[54] DEVICE FOR THE FLAME TREATMENT OF A WORK-PIECE

[75] Inventor: Alfred Pfeuffer, Neu-Isenburg, Germany

[73] Assignee: Messer Griesheim GmbH., Frankfurt am Main, Germany

[21] Appl. No.: 743,793

[22] Filed: Nov. 22, 1976

[30] Foreign Application Priority Data

Nov. 8, 1975 [DE] Fed. Rep. of Germany ....... 2553553

[51] Int. Cl.² .............................................. B23K 7/06
[52] U.S. Cl. ........................................ 266/51; 266/75
[58] Field of Search .................. 266/48, 51, 52, 53, 266/74, 75, 904

[56] References Cited

U.S. PATENT DOCUMENTS

| 2,534,363 | 12/1950 | Meincke | 266/75 |
| 2,745,475 | 5/1956 | Thompson et al. | 266/52 X |
| 3,752,460 | 8/1973 | Lytle | 266/53 |

*Primary Examiner*—Roy Lake
*Assistant Examiner*—Paul A. Bell
*Attorney, Agent, or Firm*—Ernest F. Marmorek

[57] ABSTRACT

A device for the flame treatment of a work-piece, includes upper and lower preheating blocks disposed to define a flame-oxygen duct, holding means operable for holding the blocks and including a gas distribution system communicating with said duct, and a separate nozzle communicating with the interior of the duct and operable for supplying oxygen to the duct.

5 Claims, 2 Drawing Figures

DEVICE FOR THE FLAME TREATMENT OF A WORK-PIECE

BACKGROUND OF THE INVENTION

The invention relates to a device for the flame treatment of a work-piece, including upper and lower preheating blocks which are both arranged on a holding means including a gas distribution system with the preheating blocks being arranged at a distance from one another for the purpose of forming a flame-oxygen-duct.

In the case of the conventional flaming process, the flame-burner is first of all directed toward the work-piece to be subjected to the flame treatment. After turning on the combustible gas and lighting the same, the work-piece is heated by means of the preheating flames directed toward the surface of the work-piece and this procedure is carried out up to the time the ignition temperature of the metal is attained.

The preheating process takes a considerable time, but an ignition wire or iron powder can be inserted into the heating flame to accelerate the preheating process. This is particularly expedient in cases of cold blocks or slabs, in order to eliminate an otherwise undesirably long preheating time.

The zone to be swept over by the heating flames usually extends over the entire width of the flame burner or when several flame burners are joined together to one aggregate, over the width of the latter and such a zone is disadvantageous. When using an ignition-aid, such as, for example, iron powder, it is therefore necessary to apply the powder likewise over the entire width of the zone to be treated with the flame. This, however, requires a considerable quantity of iron powder, and a correspondingly wide powder-nozzle. The flaming costs increase because of such complex powder-nozzle.

It had already been suggested to restrict locally the ignition place on the work-piece to be subjected to the action of the flame. That is, under those conditions the ignition place no longer is of an order of magnitude which corresponds to the width of the flame burner, but is of a considerably smaller order of magnitude. For this purpose, an electrode is installed in front of the flame-burner. This electrode is electrically ignited and, in this manner, a locally restricted ignition place is created ahead of the flame-burner in the flaming-zone, from which ignition place the molten metal is spread over the entire flame-path-width by means of the flame-oxygen jet lead in after the ignition. This is described in U.S. Pat. No. 2,513,425.

It is disadvantageous here that an electrical ignition device of its own has to be assigned to the flame-burner in addition to an elaborate control system and that beyond this, the electrical ignition device, after ignition had taken place, has to be removed from the flaming-zone by means of an additional pivoting device.

It is the task of the present invention to create a flame-burner by means of which a locally restricted ignition can be carried out without elaborate auxiliary means, such as e.g. an ignition electrode.

SUMMARY OF THE INVENTION

To solve the aforementioned problem, it is disclosed herein according to the invention that a separate nozzle for a supplementary oxygen jet is provided in the interior of the flame-oxygen-jet-duct.

Thus, through the arrangement of the separate nozzle in accordance with the invention, a locally restricted molten bath pool is obtained through a supplementary oxygen-jet and this molten metal pool is then spread out by means of the flame-oxygen-jet introduced at that time. Through the spreading out process, a further ignition of the metal takes place, until the entire flame-path-width is filled.

In the case of the exemplified embodiment in accordance with the invention, provisions are made that the nozzle is arranged in an expansion chamber of the flame-oxygen-duct. It is assured thereby, that the frontal area of the duct remains completely free, so that the flame-oxygen flowing therein can emerge from the burner without resistance and practically turbulence-free as a calm, flat stream.

In accordance with the invention it is advantageous if the nozzle is in the center of the flame-oxygen-duct.

In order to be able to control this supplementary oxygen stream independently of the other gas streams of the flame-burner, it is furthermore disclosed herein according to the invention that the nozzle be connected with a supply-line of its own, with a control valve provided therein.

The flame-burner, with the supplementary nozzle designed according to the invention and located in the interior of the flame-oxygen duct, is not only suited for a locally restricted ignition process, but is also advantageous by its utilization for the selective flame-treatment of the work-piece.

BRIEF DESCRIPTION OF THE DRAWINGS

The following description of a preferred exemplified embodiment of the device according to the invention, taken in conjunction with the drawings wherein.

DESCRIPTION OF THE PREFERRED EMBODIMENTS

Figure 1:
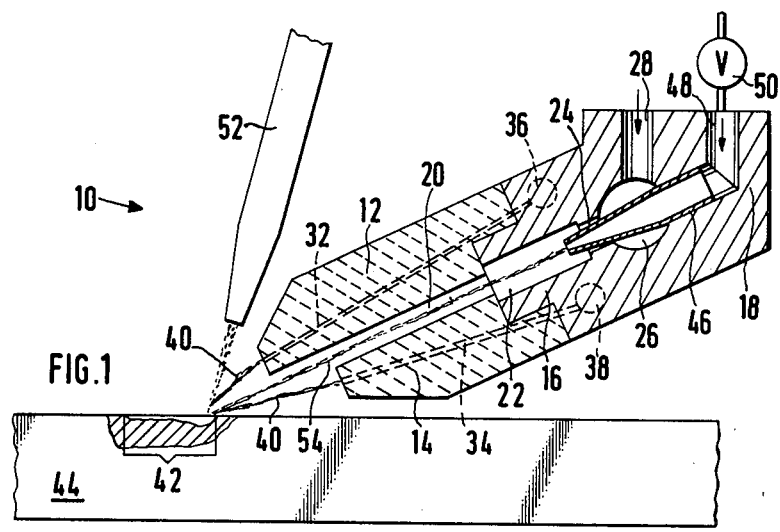
FIG. 1 shows a cross-sectional view of a flame-burner according to the invention.

The flame-burner 10 includes upper and lower preheating blocks 12 and 14 respectively. The preheating blocks 12, 14 are spaced apart from each other by a separator 16 and supported by holding means such as a headpiece 18. The preheating blocks 12, 14 define a flame-oxygen-duct 20. The flame-oxygen-duct 20 as viewed in the direction towards the headpiece 18 expands to define a first expansion chamber 22 as shown in FIG. 1. Via a transversal slit 24, the first expansion chamber 22 communicates with a second expansion chamber 26, into which the flame-oxygen necessary for the flame treatment is conducted through one or more ducts 28.

Figure 2:
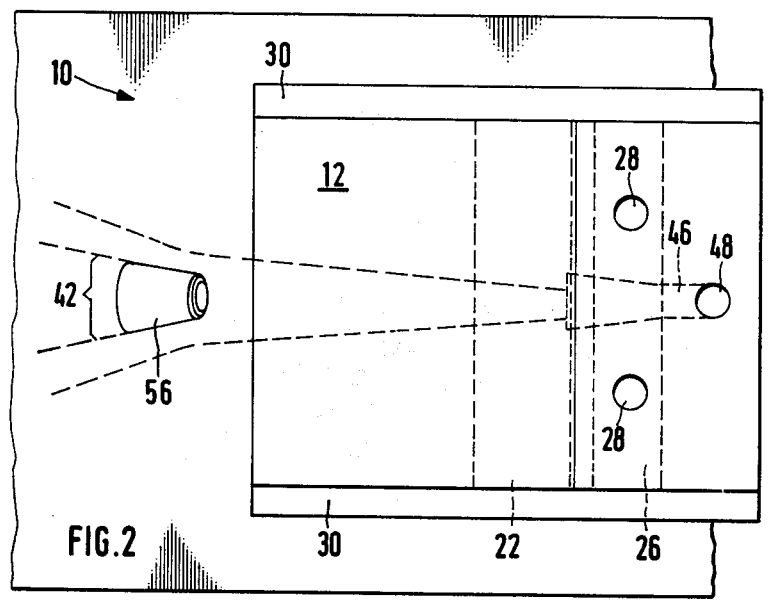
FIG. 2 shows a top-view of FIG. 1.

The lateral boundary of the flame-burner 10, in particularly of the flame-oxygen duct 20 extending over the entire width of the flame-burner inclusive of the first and second expansion chambers 22, 26, respectively, is formed by the side plates 30 as shown in FIG. 2.

A plurality of ducts 32, 34 are defined in the blocks 12, 14 and communicate with transverse expansion chambers 36 and 38 which are defined in the headpiece 18. The combustible gas and the heating oxygen (external mixture) or a combustible gas mixture flow out of the ducts 32, 34 for the formation of preheating flames 40 and are used to heat a zone 42 of a slab of iron or ingot such as work-piece 44 to an ignition temperature.

As shown in FIG. 1, a supplementary nozzle 46 is arranged in accordance with the invention in the interior of the flame-burner 10. The nozzle 46 is arranged near the center of the second expansion chamber 26, and extends with its outlet-side through the transversal slit 24 up into the first expansion chamber 22. The nozzle 46 is connected to a supply or feed line 48, in which there is a control valve 50.

FIG. 1 furthermore shows, a nozzle 52 used in connection with the flame-burner 10. Iron powder can be blown from the nozzle 52 into the preheating flame 40 during the flame treatment process, and thereby can contribute to a shortening of the flame treatment time.

After lighting the preheating flame 40, oxygen is supplied through the nozzle 46 to the interior of the flame-burner 10 and is blown into a heating-zone 42 in addition to the iron powder from the nozzle 52. This additional oxygen enrichment defines a jet stream 54 and results in an extremely rapid, locally restricted formation of a localized molten bath pool 56 in the region of the heating-zone 42. After the formation of the molten bath pool 56, the flame-oxygen being supplied through ducts 28 blows onto the molten bath pool 56 and spreads it over the entire flame-path-width. The metal likewise ignites until, in this manner, the entire flame-path-width is defined. Subsequently or simultaneously, the supplementary oxygen jet stream 54 is shut-off by means of the control valve 50.

Furthermore, it is possible to flame-treat a narrow flame-path with the flame-oxygen-jet 54 without the flame oxygen supplied through the ducts 28. The flame-path-width depends on the size and shape of the nozzle 46, which can be constructed in the shape of a round nozzle, as well as in the shape of a slit nozzle.

By means of the flame-burner designed according to the invention, it is possible to substantially reduce the time needed for the heating process through locally restricted ignition and the foremation of a molten bath pool as compared to the prior art. Furthermore, a considerable reduction in the quantity of iron powder needed is possible. These advantages are obtained because it is no longer needed to apply iron powder onto the entire flame-path-width, but, if required at all, it need be only applied to the ignition region delineated by the supplementary oxygen jet stream 54.

I wish it to be understood that I do not desire to be limited to the exact details of construction shown and described, for obvious modifications will occur to a person skilled in the art.

Having thus described the invention, what I claim as new and desired to be secured by Letters Patent, is as follows:

1. Device for scarfing of a metal work-piece, the combination with upper and lower preheating blocks disposed to define a scarfing-oxygen duct, holding means operable for holding said blocks, and including an oxygen distribution system in communication with said duct, and a separate nozzle communicating with said duct and operable for supplying an additional oxygen stream through said duct to the work-piece zone for ignition of said metal heating zone, said separate nozzle being arranged in an expansion chamber in the interior of said holding means and being connected to a separate supply line.

2. The device as claimed in claim 1, wherein said nozzle is disposed with its outlet directed towards the central portion of said duct.

3. The device as claimed in claim 1, further comprising a control valve connected to said nozzle and being operable for shutting off said additional oxygen stream to said nozzle upon the spread of the oxygen over a predetermined width of the flame path after ignition.

4. In a device for scarfing of a metal workpiece within a flame path generated by a first oxygen stream, comprising in combination:
upper and lower preheating blocks defining a flame-oxygen duct,
holding means defining an expansion chamber structure and being operable for holding said blocks, including an oxygen distribution system in communication with said duct,
a separate nozzle arranged in said expansion chamber structure, said expansion chamber structure communicating interiorly with said nozzle and said duct, and being operable for supplying an additional oxygen stream through said duct, and
a separate supply line connected to said expansion chamber structure.

5. In a device for scarfing of a metal work-piece within a flame path generated by a first oxygen stream, and iron powder added to the first oxygen stream, comprising in combination:
a first nozzle for supplying said first oxygen stream, and said iron powder,
upper and lower preheating blocks defining a flame-oxygen duct,
holding means defining an expansion chamber structure and being operable for holding said blocks, including an oxygen distribution system in communication with said duct,
a separate nozzle arranged in said expansion chamber structure, said expansion chamber structure communicating interiorly with said nozzle and said duct, and being operable for supplying an additional oxygen stream through said duct, and
a separate supply line connected to said expansion chamber structure.

* * * * *